United States Patent
Chuang et al.

(10) Patent No.: US 9,955,177 B2
(45) Date of Patent: Apr. 24, 2018

(54) INTER-LAYER TEXTURE CODING WITH ADAPTIVE TRANSFORM AND MULTIPLE INTER-LAYER MOTION CANDIDATES

(71) Applicant: MediaTek Inc., Hsin-Chu (TW)

(72) Inventors: Tzu-Der Chuang, Zhubei (TW); Zhenzhong Chen, San Jose, CA (US); Shan Liu, San Jose, CA (US); Ching-Yeh Chen, Taipei (TW); Chih-Wei Hsu, Taipei (TW)

(73) Assignee: MediaTek Inc., Hsin-Chu (TW)

( * ) Notice: Subject to any disclaimer, the term of this patent is extended or adjusted under 35 U.S.C. 154(b) by 139 days.

(21) Appl. No.: 14/442,925

(22) PCT Filed: Oct. 29, 2013

(86) PCT No.: PCT/CN2013/086151
§ 371 (c)(1),
(2) Date: May 14, 2015

(87) PCT Pub. No.: WO2014/075552
PCT Pub. Date: May 22, 2014

(65) Prior Publication Data
US 2015/0296211 A1    Oct. 15, 2015

Related U.S. Application Data

(60) Provisional application No. 61/726,837, filed on Nov. 15, 2012.

(51) Int. Cl.
*H04N 19/30* (2014.01)
*H04N 19/105* (2014.01)
(Continued)

(52) U.S. Cl.
CPC ............ *H04N 19/30* (2014.11); *H04N 19/105* (2014.11); *H04N 19/12* (2014.11); *H04N 19/134* (2014.11);
(Continued)

(58) Field of Classification Search
CPC ...... H04N 19/30; H04N 19/105; H04N 19/12; H04N 19/134; H04N 19/176; H04N 19/187; H04N 19/50; H04N 19/52; H04N 19/61
(Continued)

(56) References Cited

U.S. PATENT DOCUMENTS

| | | |
|---|---|---|
| 2008/0260043 A1 | 10/2008 | Bottreau et al. |
| 2009/0238271 A1 | 9/2009 | Kim et al. |

(Continued)

FOREIGN PATENT DOCUMENTS

| | | |
|---|---|---|
| CN | 101184240 | 5/2008 |
| EP | 1 933 565 | 6/2008 |
| EP | 2 346 258 | 7/2011 |

OTHER PUBLICATIONS

Schwarz, H., et al.; "Overview of the Scalable Video Coding Extension of the H.264/AVC Standard;" IEEE Transactions on Circuits and Systems for Video Technology; vol. 17; No. 9; Sep. 2007; pp. 1103-1120.

(Continued)

*Primary Examiner* — William C Vaughn, Jr.
*Assistant Examiner* — Jae N Noh
(74) *Attorney, Agent, or Firm* — Wolf, Greenfield & Sacks, P.C.

(57) ABSTRACT

Methods of adaptive transform type based on transform unit (TU) size for enhancement layer (EL) coding and multiple motion candidates for EL coding based on corresponding base layer (BL) video data are provided. One method selects (Continued)

a transform type from multiple allowable transform types based on the TU size and applies the selected transform type to the transform units of the inter-layer prediction processed data. Another method derives multiple motion candidates for the EL video data coded in Merge mode or Inter mode based on motion information associated with the corresponding BL video data.

7 Claims, 6 Drawing Sheets

(51) Int. Cl.
| | | |
|---|---|---|
| *H04N 19/176* | (2014.01) | |
| *H04N 19/61* | (2014.01) | |
| *H04N 19/52* | (2014.01) | |
| *H04N 19/12* | (2014.01) | |
| *H04N 19/187* | (2014.01) | |
| *H04N 19/50* | (2014.01) | |
| *H04N 19/134* | (2014.01) | |

(52) U.S. Cl.
CPC ......... *H04N 19/176* (2014.11); *H04N 19/187* (2014.11); *H04N 19/50* (2014.11); *H04N 19/52* (2014.11); *H04N 19/61* (2014.11)

(58) Field of Classification Search
USPC .................................................. 375/240.12
See application file for complete search history.

(56) References Cited

U.S. PATENT DOCUMENTS

| | | | | |
|---|---|---|---|---|
| 2013/0094589 | A1* | 4/2013 | Rosewarne | H04N 19/70 375/240.18 |
| 2013/0195186 | A1* | 8/2013 | Yu | H04N 19/50 375/240.12 |
| 2013/0315302 | A1* | 11/2013 | Lim | H04N 19/176 375/240.03 |
| 2014/0092956 | A1* | 4/2014 | Panusopone | H04N 19/00781 375/240.02 |
| 2014/0307799 | A1* | 10/2014 | Oh | H04N 19/159 375/240.16 |

OTHER PUBLICATIONS

An, J., et al.; "Non-CE7: Boundary-Dependent Transform for Inter-Predicted Residue;" Joint Collaborative Team on Video Coding (JCT-VC) of ITU-T SG 16 WP3 and ISO/IEC JTC1/SC29/WG11; Nov. 2011; pp. 1-10.

Saxena, A., et al.; "CE7: Mode-dependent DCT/DST without 4X4 full matrix multiplication for intra prediction;" Joint Collaborative Team on Video Coding (JCT-VC) of ITU-T SG 16 WP3 and ISO/IEC JTC1/SC29/WG11; Mar. 2011; pp. 1-10.

Sullivan, G., et al.; "Joint Call for Proposals on Scalable Video Coding Extensions of High Efficiency Video Coding (HEVC);" ITU-Telecommunications Standardization Sector; 45th Meeting; Jul. 2012; pp. 1-11.

Park, U.K., et al.; "Scalable video coding with large block for UHD Video;" IEEE Transactions on Consumer Electronics; vol. 58; No. 3; Aug. 2012; pp. 932-940.

Seregin, V., et al.; "AHG11: DST transform for Intra-BL mode;" Joint Collaborative Team on Video Coding (JCT-VC) of ITU-TSG 16 WP3 and ISO/IEC JTC1/SC29/WG11; Jan. 2013; pp. 1-2.

Chen, J., et al.; "SHVC Test Model 1 (SHM 1);" Joint Collaborative Team on Video Coding (JCT-VC) of ITU-T SG 16 WP3 and ISO/IEC JTC1/SC29/WG11; Jan. 2013; pp. 1-41.

Yeo, C., et al.; "On transform selection for intraBL mode in SHVC;" Joint Collaborative Team on Video Coding (JCT-VC) of ITU-TSG 16 WP3 and ISO/IEC JTC1/SC29/WG11; Jan. 2013; pp. 1-3.

International Search Report dated Jan. 30, 2014, issued in PCT/CN2013/086151.

* cited by examiner

INTER-LAYER TEXTURE CODING WITH ADAPTIVE TRANSFORM AND MULTIPLE INTER-LAYER MOTION CANDIDATES

CROSS REFERENCE TO RELATED APPLICATIONS

The present application is a National Stage Application of PCT Application Ser. No. PCT/CN2013/086151, filed on Oct. 29, 2013, which claims priority to U.S. Provisional Patent Application Ser. No. 61/726,837, filed Nov. 15, 2012, entitled "Methods of Inter-layer texture prediction transform and multiple inter-layer motion candidates for Scalable Video Coding". The priority applications are hereby incorporated by reference in their entirety.

FIELD OF INVENTION

The present invention relates to scalable video coding. In particular, the present invention relates to inter-layer texture coding incorporating adaptive transform or multiple inter-layer motion candidates.

BACKGROUND OF THE INVENTION

Compressed digital video has been widely used in various applications such as video streaming over digital networks and video transmission over digital channels. Very often, a single video content may be delivered over networks with different characteristics. For example, a live sport event may be carried in a high-bandwidth streaming format over broadband networks for premium video service. In such applications, the compressed video usually preserves high resolution and high quality so that the video content is suited for high-definition devices such as an HDTV or a high resolution LCD display. The same content may also be carried through cellular data network so that the content can be watch on a portable device such as a smart phone or a network-connected portable media device. In such applications, due to the network bandwidth concerns as well as the typical low-resolution display on the smart phone or portable devices, the video content usually is compressed into lower resolution and lower bitrates. Therefore, for different network environment and for different applications, the video resolution and video quality requirements are quite different. Even for the same type of network, users may experience different available bandwidths due to different network infrastructure and network traffic condition. Therefore, a user may desire to receive the video at higher quality when the available bandwidth is high and receive a lower-quality, but smooth, video when the network congestion occurs. In another scenario, a high-end media player can handle high-resolution and high bitrate compressed video while a low-cost media player is only capable of handling low-resolution and low bitrate compressed video due to limited computational resources. Accordingly, it is desirable to construct the compressed video in a scalable manner so that videos at different spatial-temporal resolution and/or quality can be derived from the same compressed bitstream.

The joint video team (JVT) of ISO/IEC MPEG and ITU-T VCEG standardized a Scalable Video Coding (SVC) extension of the H.264/AVC standard. An H.264/AVC SVC bitstream can contain video information from low frame-rate, low resolution, and low quality to high frame rate, high definition, and high quality. This single bitstream can be adapted to various applications and displayed on devices with different configurations. Accordingly, H.264/AVC SVC is suitable for various video applications such as video broadcasting, video streaming, and video surveillance to adapt to network infrastructure, traffic condition, user preference, and etc.

In SVC, three types of scalabilities, i.e., temporal scalability, spatial scalability, and quality scalability, are provided. SVC uses multi-layer coding structure to realize the three dimensions of scalability. A main goal of SVC is to generate one scalable bitstream that can be easily and rapidly adapted to the bit-rate requirement associated with various transmission channels, diverse display capabilities, and different computational resources without trans-coding or re-encoding. An important feature of the SVC design is that the scalability is provided at a bitstream level. In other words, bitstreams for deriving video with a reduced spatial and/or temporal resolution can be simply obtained by extracting Network Abstraction Layer (NAL) units (or network packets) from a scalable bitstream that are required for decoding the intended video. NAL units for quality refinement can be additionally truncated in order to reduce the bit-rate and the associated video quality.

In SVC, spatial scalability is supported based on the pyramid coding scheme as shown in FIG. 1. In a SVC system with spatial scalability, the video sequence is first down-sampled to obtain smaller pictures at different spatial resolutions (layers). For example, picture 110 at the original resolution can be processed by spatial decimation 120 to obtain resolution-reduced picture 111. The resolution-reduced picture 111 can be further processed by spatial decimation 121 to obtain further resolution-reduced picture 112 as shown in FIG. 1. In addition to dyadic spatial resolution, where the spatial resolution is reduced to half in each level, SVC also supports arbitrary resolution ratios, which is called extended spatial scalability (ESS). The SVC system in FIG. 1 illustrates an example of spatial scalable system with three layers, where layer 0 corresponds to the pictures with lowest spatial resolution and layer 2 corresponds to the pictures with the highest resolution. The layer-0 pictures are coded without reference to other layers, i.e., single-layer coding. For example, the lowest layer picture 112 is coded using motion-compensated and Intra prediction 130.

The motion-compensated and Intra prediction 130 will generate syntax elements as well as coding related information such as motion information for further entropy coding 140. FIG. 1 actually illustrates a combined SVC system that provides spatial scalability as well as quality scalability (also called SNR scalability). The system may also provide temporal scalability, which is not explicitly shown. For each single-layer coding, the residual coding errors can be refined using SNR enhancement layer coding 150. The SNR enhancement layer in FIG. 1 may provide multiple quality levels (quality scalability). Each supported resolution layer can be coded by respective single-layer motion-compensated and Intra prediction like a non-scalable coding system. Each higher spatial layer may also be coded using inter-layer coding based on one or more lower spatial layers. For example, layer 1 video can be adaptively coded using inter-layer prediction based on layer 0 video or a single-layer coding on a macroblock by macroblock basis or other block unit. Similarly, layer 2 video can be adaptively coded using inter-layer prediction based on reconstructed layer 1 video or a single-layer coding. As shown in FIG. 1, layer-1 pictures 111 can be coded by motion-compensated and Intra prediction 131, base layer entropy coding 141 and SNR enhancement layer coding 151. As shown in FIG. 1, the reconstructed BL video data is also utilized by motion-compensated and Intra prediction 131, where a coding block in spatial layer 1 may use the reconstructed BL video data as an additional Intra prediction data (i.e., no motion compensation is involved). Similarly, layer-2 pictures 110 can be coded by motion-compensated and Intra prediction 132, base layer entropy coding 142 and SNR enhancement layer coding 152. The BL bitstreams and SNR enhancement layer bitstreams from all spatial layers are multiplexed by multiplexer 160 to generate a scalable bitstream. The coding efficiency can be improved due to inter-layer coding. Furthermore, the information required to code spatial layer 1 may depend on reconstructed layer 0 (inter-layer prediction). A higher layer in an SVC system is referred as an enhancement layer. The H.264 SVC provides three types of inter-layer prediction tools: inter-layer motion prediction, inter-layer Intra prediction, and inter-layer residual prediction.

In SVC, the enhancement layer (EL) can reuse the motion information in the base layer (BL) to reduce the inter-layer motion data redundancy. For example, the EL macroblock coding may use a flag, such as base_mode_flag before mb_type is determined to indicate whether the EL motion information is directly derived from the BL. If base_mode_flag is equal to 1, the partitioning data of the EL macroblock along with the associated reference indexes and motion vectors are derived from the corresponding data of the collocated 8×8 block in the BL. The reference picture index of the BL is directly used in the EL. The motion vectors of the EL are scaled from the data associated with the BL. Besides, the scaled BL motion vector can be used as an additional motion vector predictor for the EL.

Inter-layer residual prediction uses the up-sampled BL residual information to reduce the information required for coding the EL residuals. The collocated residual of the BL can be block-wise up-sampled using a bilinear filter and can be used as prediction for the residual of a corresponding macroblock in the EL. The up-sampling of the reference layer residual is done on transform block basis in order to ensure that no filtering is applied across transform block boundaries.

Similar to inter-layer residual prediction, the inter-layer Intra prediction reduces the redundant texture information of the EL. The prediction in the EL is generated by block-wise up-sampling the collocated BL reconstruction signal. In the inter-layer Intra prediction (ILIP, or so called inter-layer texture prediction) up-sampling procedure, 4-tap and 2-tap FIR filters are applied for luma and chroma components, respectively. Different from inter-layer residual prediction, filtering for the inter-layer Intra prediction is always performed across sub-block boundaries. For decoding simplicity, inter-layer Intra prediction can be applied only to the intra-coded macroblocks in the BL.

As shown in FIG. 1, reconstructed video at a lower layer is used for coding by a higher layer. The lower layer video corresponds to a lower spatial or temporal resolution, or lower quality (i.e., lower SNR). When the lower spatial resolution video in a lower layer is used by a higher layer coding, the lower spatial resolution video usually is up-sampled to match the spatial resolution of the higher layer. The up-sampling process artificially increases the spatial resolution. However, it also introduces undesirable artifacts. It is desirable to develop new techniques to use reconstructed video from a lower layer to improve the inter-layer coding efficiency.

SUMMARY OF THE INVENTION

A method and apparatus of inter-layer prediction for scalable video coding are disclosed, wherein the video data is configured into a Base Layer (BL) and an Enhancement Layer (EL) and wherein EL video data has higher spatial resolution or better video quality than BL video data. Embodiments according to the present invention receive input data associated with the EL video data, wherein the EL video data is partitioned into TUs (transform units) and each TU has a TU (transform unit) size. A first type transform/inverse transform or a second type transform/inverse transform is then applied to the input data corresponding to the current TU of the EL video data depending on the current TU size. The input data associated with the EL video data corresponds to inter-layer texture prediction processed video data to be coded or coded inter-layer texture prediction processed video data to be decoded. The first type transform/inverse transform can be either the discrete sine transform (DST)/inverse DST or the discrete cosine transform (DCT)/inverse DCT. The second type transform/inverse transform can also be selected from the DST/inverse DST and the DCT/inverse DCT, and the second type transform/inverse transform is different from the first type transform/inverse transform. In one embodiment, the first type transform/inverse transform is used if the current TU size is equal to a pre-defined size. In another embodiment, the second type transform/inverse transform is used if the current TU size is greater than a pre-defined size. The pre-defined size can be 4×4.

In other embodiments of the present invention, input data associated with a current EL block of the EL video data is received and a corresponding BL block in the BL is determined. Two or more inter-layer candidates are derived based on BL motion information associated with the corresponding BL video data, wherein said two or more inter-layer candidates are added to a Merge candidate list or AMVP (advanced motion vector prediction) candidate list. A final motion vector predictor is then derived from the Merge candidate list or the AMVP candidate list and the final motion vector predictor is used to encode or decode the current EL block in the Merge mode or the Inter mode based on AMVP. At least one of said two or more inter-layer candidates can be derived based on scaled BL motion information associated with selected BL video data in the corresponding BL block. The selected BL video data in the corresponding BL block corresponds to at least one location of four corner BL pixels and four center BL pixels, wherein the four corner BL pixels and the four center BL pixels are collocated with four corner EL pixels and four center EL pixels of the current EL block respectively. The corresponding BL video data may include one or more neighboring BL blocks of the corresponding BL block and at least one of said two or more inter-layer candidates is derived based on second scaled BL motion information associated with said one or more neighboring BL blocks of the corresponding BL block. Said one or more neighboring BL blocks of the corresponding BL block correspond to a bottom-left BL block, a left BL block, an upper-right BL block, a top BL block and an upper-left BL block. The BL motion information may include Inter prediction direction, reference picture index, and motion vector.

DETAILED DESCRIPTION

Figure 1:
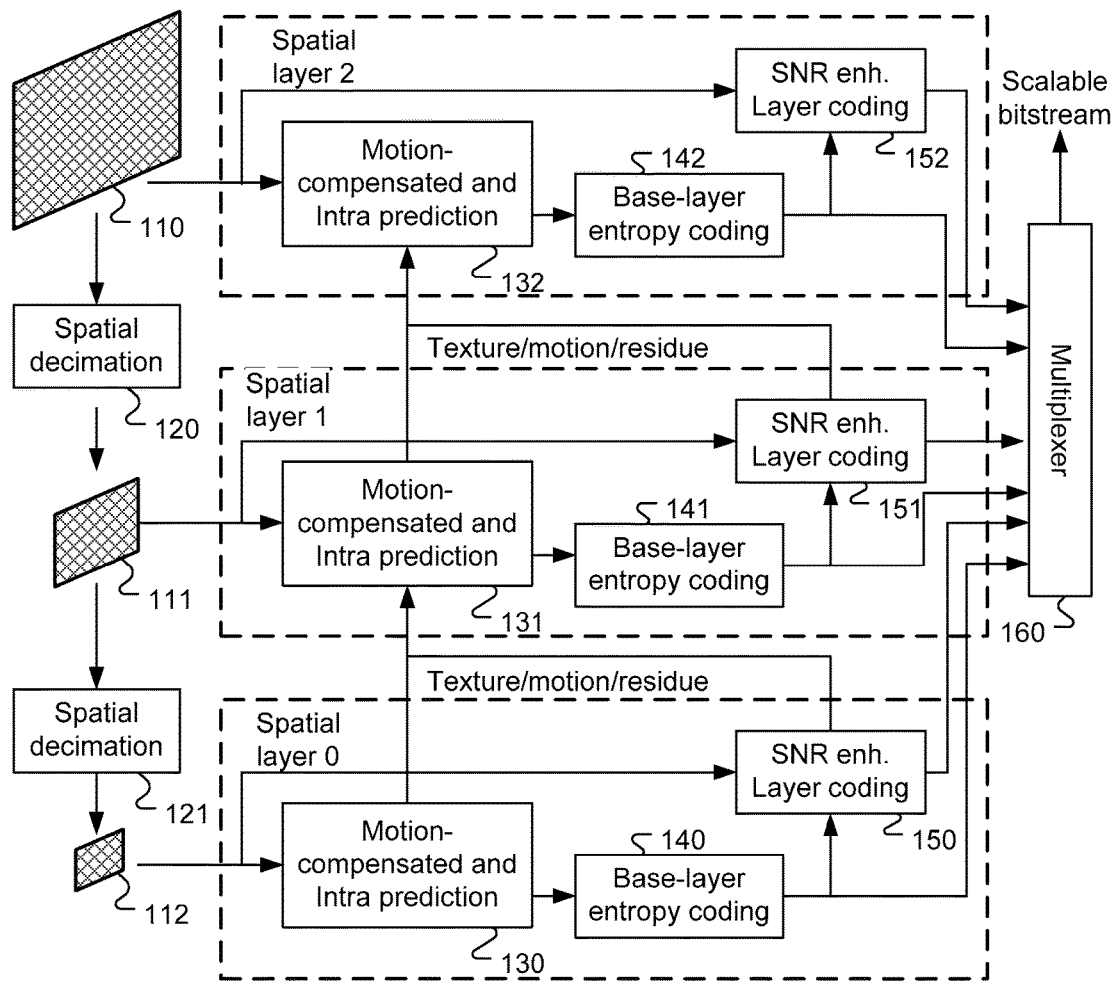
FIG. 1 illustrates an example of prediction structure for a scalable video coding system.
Figure 2:
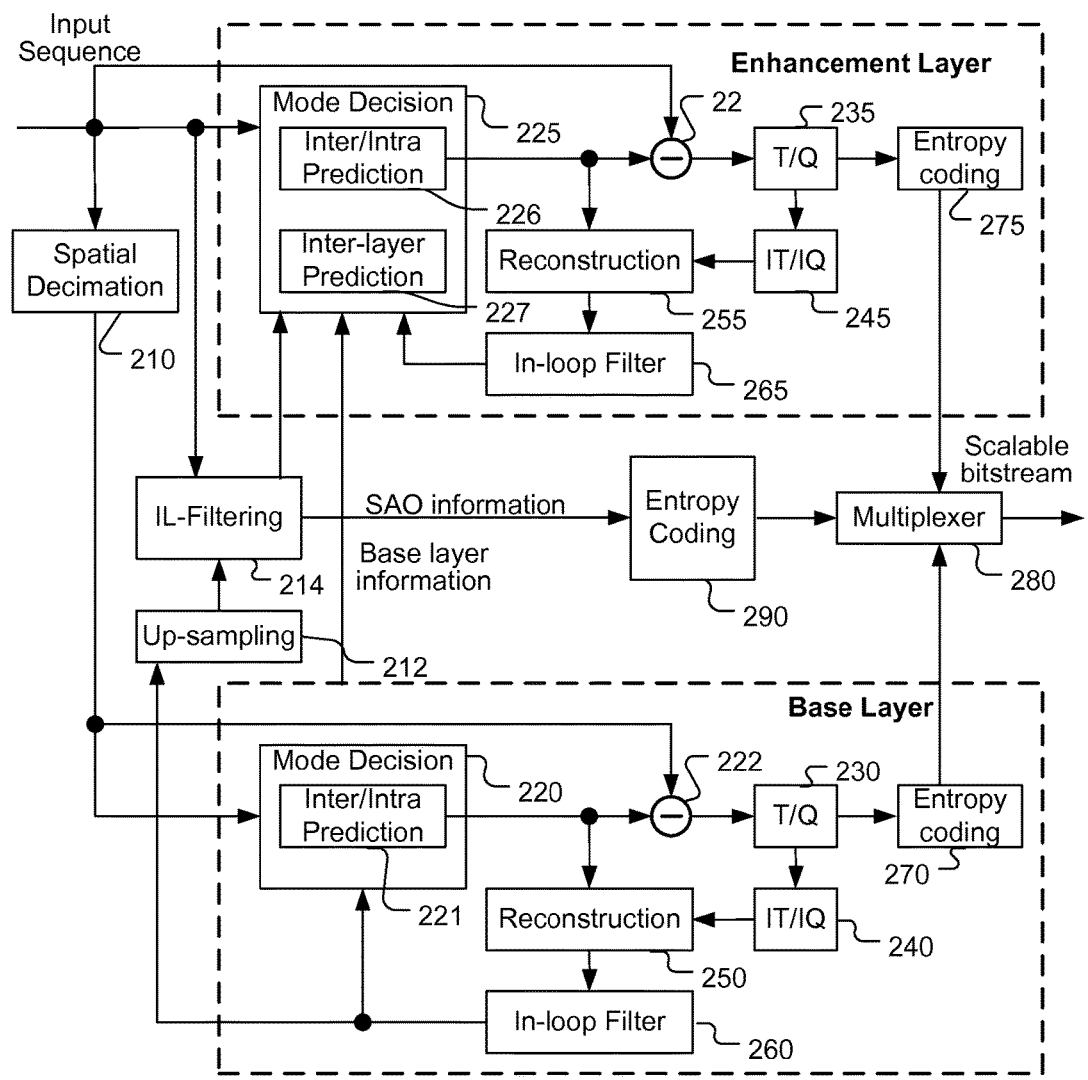
FIG. 2 illustrates a block diagram of an exemplary two-layer scalable video encoding system incorporating inter-layer Intra prediction.

In H.264/AVC, only the discrete cosine transform (DCT) is used for the inter-layer texture prediction coded block. In HEVC, both the DCT and the discrete sine transform (DST) can be used. Embodiments of the present invention apply a transform to the transform units of the enhancement layer video data processed by inter-layer texture prediction, where the transform type is dependent on the TU size. For example, if the TU size is equal to 4×4, the DST is applied. If the TU size is larger than 4×4, the DCT is applied. The DCT and the DS are referred as two different transform types in this disclosure. Other transform types, such as Hadamard transform, may also be used to practice the present invention. The TU size-dependent transform can be applied to coding units of the enhancement layer processed by inter-layer Intra prediction (ILIP, or so called inter-layer texture prediction) in scalable video coding. ILIP is used to remove the texture redundancy between layers. The reconstructed BL samples are up-sampled to generate the predictor for collocated EL (enhancement layer) samples, as shown in FIG. 2. The inter-layer prediction process comprises identifying the collocated block in the lower layer (e.g. BL) based on the location of a corresponding EL block and interpolating the collocated lower layer block to generate prediction samples for the EL as shown in FIG. 2. In scalable video coding, the interpolation process is used for inter-layer prediction by using predefined coefficients to generate the prediction samples for the EL based on the lower layer pixels.

The example in FIG. 2 consists of two layers. However, an SVC system may consist of more than two layers. The BL picture is formed by applying spatial decimation 210 to the input picture. The BL processing comprises BL prediction 220. The BL input is predicted by BL prediction 220, where subtractor 222 is used to form the difference between the BL input data and the BL prediction. The output of subtractor 222 corresponds to the BL prediction residues and the residues are processed by transform/quantization (T/Q) 230 and entropy coding 270 to generate compressed bitstream for the BL. Reconstructed BL data has to be generated at the BL in order to form BL prediction. Accordingly, inverse transform/inverse quantization (IT/IQ) 240 is used to recover the BL residues. The recovered BL residues and the BL prediction data are combined using reconstruction 250 to form reconstructed BL data. The reconstructed BL data is processed by in-loop filter 260 before it is stored in buffers inside the BL prediction. In the BL, BL prediction 220 uses Inter/Intra prediction 221. The EL processing consists of similar processing modules as the BL processing. The EL processing comprises EL prediction 225, subtractor 228, T/Q 235, entropy coding 275, IT/IQ 245, reconstruction 255 and in-loop filter 265. However, the EL prediction also utilizes reconstructed BL data as inter-layer prediction. Accordingly, EL prediction 225 comprises inter-layer prediction 227 in addition to Inter/Intra prediction 226. The reconstructed BL data is interpolated using up-sampling 212 and followed by inter-layer (IL) filtering 214 before it is used for inter-layer prediction. The compressed bitstreams from the BL and the EL are combined using multiplexer 280.

Figure 3:
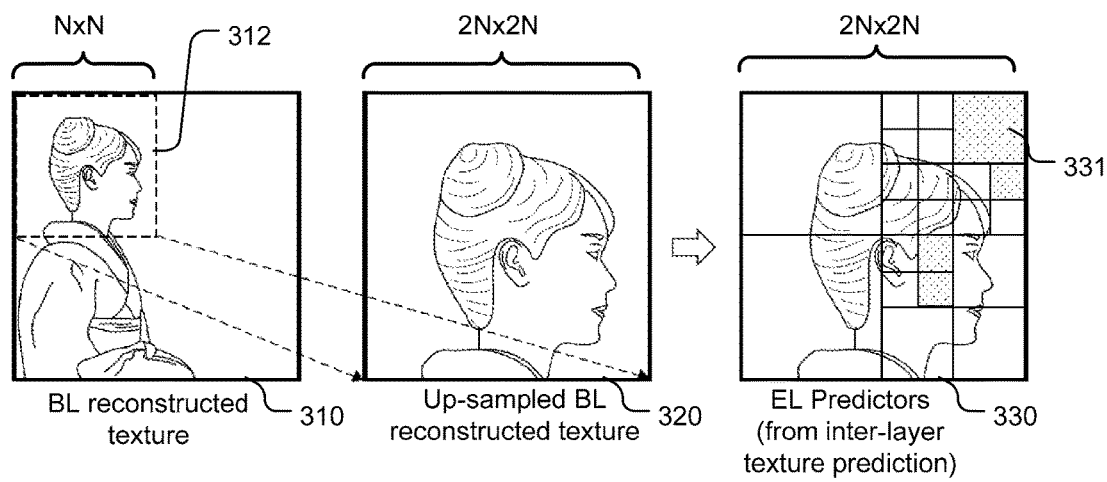
FIG. 3 illustrates an example of up-sampling a base-layer texture block and using the up-sampled base-layer block for prediction of an enhancement-layer block.

In FIG. 2, the encoder provides the difference information between the up-sampled BL and the EL in the enhancement bitstream. The difference information is added to the prediction as inter-layer prediction. In the HEVC based scalable extension, when a coding unit (CU) in the EL is coded as ILIP, the corresponding texture in the BL is up-sampled and used as texture predictors for the CU in the EL, as shown in FIG. 3. Block 310 corresponds to a 2N×2N reconstructed BL block. Block 312 corresponds to an N×N sub-block of the 2N×2N reconstructed BL block. Block 312 is up-sampled to 2N×2N block 320. The up-sampled BL block (320) is then used for prediction of a collocated EL block (330). The predictors in block 331 are from other mode. The up-sampling procedure of generating the inter-layer texture prediction samples is based on the up-sampling filter and phase shift adopted in the HEVC standard. For the main coding profile of HEVC, DST is used for the Intra prediction residue of the 4×4 coding unit (CU) of the luma component.

In the conventional scalable video coding (SVC) standard, both inter-layer texture (Intra) prediction (ILIP) and Intra prediction within the same layer use the DCT. Embodiments of the present invention select the DST or DCT for luma inter-layer texture (Intra) prediction based on the transform unit (TU) size. For example, if a CU is predicted by inter-layer texture (Intra) prediction and if the TU size is 4×4, then DST is used for the luma component and DCT is used for other TU sizes (i.e., TU size>4×4).

In another embodiment of the present invention, separable up-sampling filters are used to up-sample the reconstructed BL signal for inter-layer prediction when DCT based up-sampling filter is used. The sum of the filter coefficients is 128, i.e., 7 bit precision. Both directions (i.e., horizontal and vertical) use the same one-dimensional (1-D) DCT based up-sampling filter. An 8-tap 1-D DCT filter is used for the luma component, and a 4-tap 1-D DCT filter is used for the chroma component. Depending on the up-sampling ratio, the locations of up-sampled pixels are associated with different filter phases. A set of filter coefficients is used for pixels in each filter phase. The filter coefficients are shown in Table 1 and Table 2. The phases of down-sampled sequences can be shifted according to the down-sampling method. Based on this, position and filter coefficients for up-sampling are determined by the phase of the down-sampled video sequence.

TABLE 1

| Phase | Filter coefficients |
| --- | --- |
| 0 | {0, 128, 0, 0}, |
| 1/4 | {−12, 112, 36, −8}, |
| 1/3 | {−13, 101, 50, −10}, |
| 3/8 | {−14, 96, 57, −11}, |
| 1/2 | {−13, 77, 77, −13}, |
| 7/12 | {−12, 64, 90, −14}, |
| 2/3 | {−10, 50, 101, −13}, |
| 7/8 | {−4, 17, 122, −7}, |
| 11/12 | {−3, 11, 125, −5} |

TABLE 2

| Phase | Filter coefficients |
|---|---|
| 0 | {0, 0, 0, 128, 0, 0, 0, 0} |
| 1/3 | {−3, 9, −22, 105, 52, −18, 8, −3} |
| 1/2 | {−3, 10, −23, 80, 80, −23, 10, −3} |
| 2/3 | {−3, 8, −18, 52, 105, −22, 9, −3} |

In HEVC, the motion information of neighboring block and temporal collocated block can be used to derive the Merge and AMVP candidates. Advanced motion vector prediction (AMVP) is a coding tools used in HEVC for Inter prediction. The motion information includes Inter prediction direction (inter_pred_idc), reference index (refIdx), motion vector (MVs), motion vector predictor (MVP), MVP index, Merge index, Merge candidate, etc. For scalable video coding extension of HEVC, the motion information of a corresponding block in BL can be utilized as inter-layer predictor or inter-layer candidate for EL motion information prediction. For example, the scaled BL motion information can be added into the AMVP list and/or Merge list of the EL as one of the prediction candidates. If the resolution of the EL block is two times of the resolution of the BL block, a motion vector for the BL block has to be scaled by a factor of two for the EL block.

Figure 4:
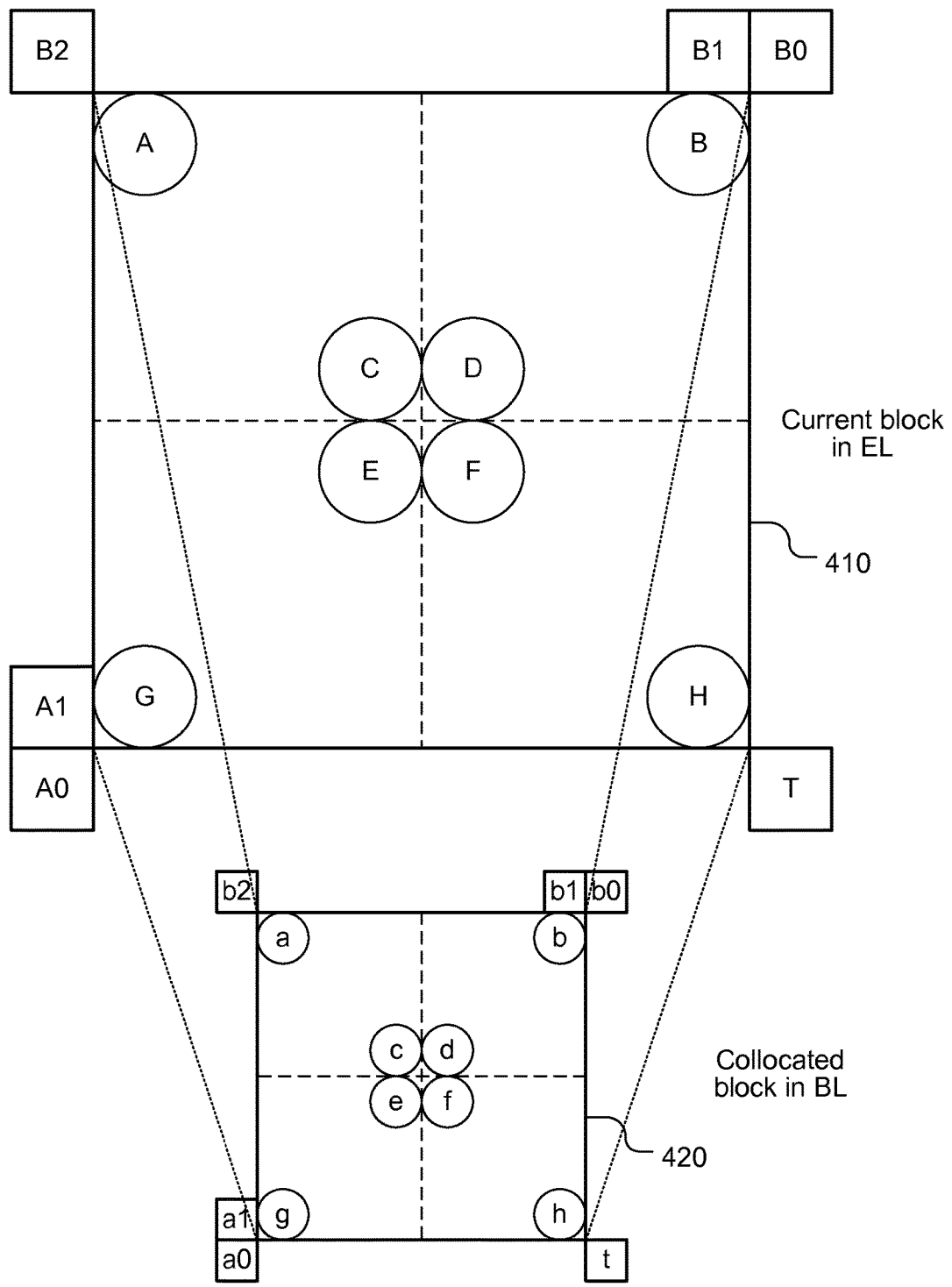
FIG. 4 illustrates an example of deriving multiple candidates for an enhancement-layer block based on motion information of a corresponding base-layer block and neighboring blocks of the base-layer block.

The motion information of the corresponding block in the BL may correspond to the motion information within the corresponding block in the BL. For example, the motion information associated with locations a-h in the collocated block in BL as shown in FIG. 4 can be used to derive inter-layer prediction. In FIG. 4, block 410 corresponds to a current block in the EL and block 420 is the corresponding block in the BL. the motion information at a, b, g, and h in the BL are the corresponding motion information of A, B, G, and H in EL. The c, d, e, f are the corresponding motion information of C, D, E, and F in the EL. Locations A, B, G, and H are the four corner pixels of the current block in the EL and locations C, D, E, and F are the four center pixels of the current block in the EL.

Not only the motion information of the corresponding block in the BL, but also the motion information of neighboring blocks of the corresponding block in the BL can be utilized as inter-layer candidates for the EL to include in the Merge/AMVP candidate list. As shown in FIG. 4, the neighboring candidates in BL, including t (bottom-right), a0 (bottom-left), a1 (left), b0 (upper-right), b1 (top), and b2 (upper-left) neighboring BL blocks, can be used as a candidate for the EL to include in the Merge/AMVP candidate derivation. The collocated EL neighboring blocks correspond to T (bottom-right), A0 (bottom-left), A1 (left), B0 (upper-right), B1 (top), and B2 (upper-left) neighboring EL blocks respectively.

In H.264/AVC, only one inter-layer candidate is used for MV prediction. Embodiments of the present invention use two or more inter-layer candidates for the EL to include in the Merge/AMVP candidate derivation. The inter-layer candidates can be the motion information inside the corresponding block in BL (e.g. motion information associated with a-h in FIG. 4) or the motion information of the neighboring blocks of the corresponding block in BL (e.g. the a0, a1, a2, b0, b1, b2 and t in FIG. 4). For example, two inter-layer candidates for the EL to include in the Merge candidate list or the AMVP candidate list can be used, where one candidate corresponds to location c and the other candidate corresponds to location t in FIG. 4. In another example, one candidate corresponds to location f and the other candidate corresponds to location h in FIG. 4. To reduce the candidate redundancy, the latter inter-layer candidates can perform the redundancy check with the first inter-layer candidate or any EL candidates.

Figure 5:
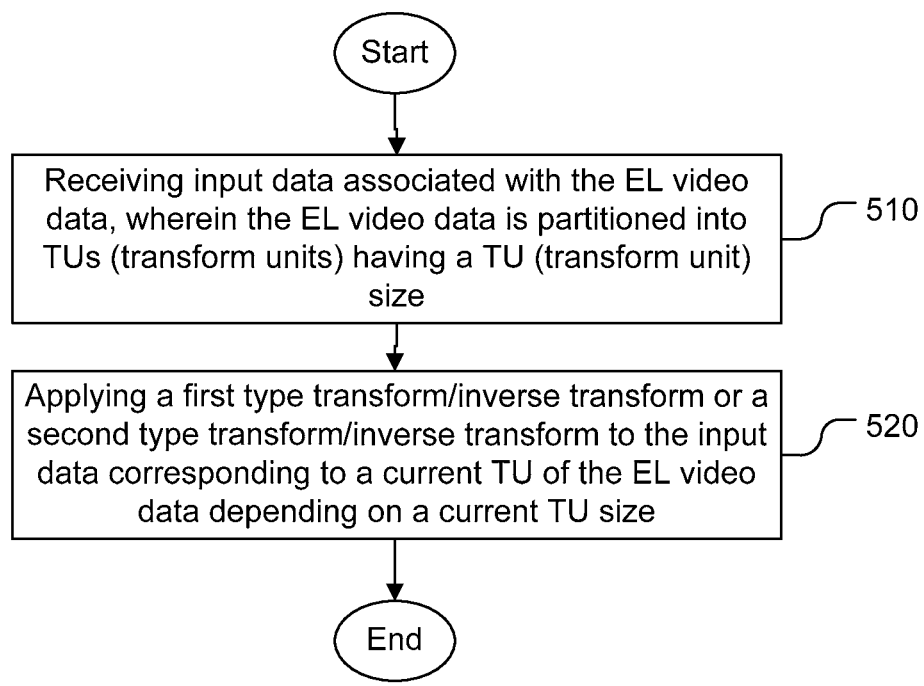
FIG. 5 illustrates an exemplary flowchart of a scalable video coding system incorporating a transform type depending on transform unit size according to an embodiment of the present invention.

FIG. 5 illustrates an exemplary flowchart of a scalable video coding system incorporating an adaptive transform type selection based on transform unit size according to an embodiment of the present invention. The video data is configured into a Base Layer (BL) and an Enhancement Layer (EL), where the EL video data has higher spatial resolution or better video quality than the BL video data. The system receives input data associated with the EL video data, wherein the EL video data is partitioned into TUs (transform units) having a TU (transform unit) size as shown in step 510. For encoding, the input data corresponds to the inter-layer prediction processed video data that is to be coded. For decoding, the input data corresponds to coded inter-layer prediction processed video data that is to be decoded. The input data may be retrieved from storage such as a computer memory, buffer (RAM or DRAM) or other media. The input data may also be received from a processor such as a controller, a central processing unit, a digital signal processor or electronic circuits that produce the input data. A first type transform/inverse transform or a second type transform/inverse transform is applied to the input data corresponding to a current TU of the EL video data depending on a current TU size as shown in step 520.

Figure 6:
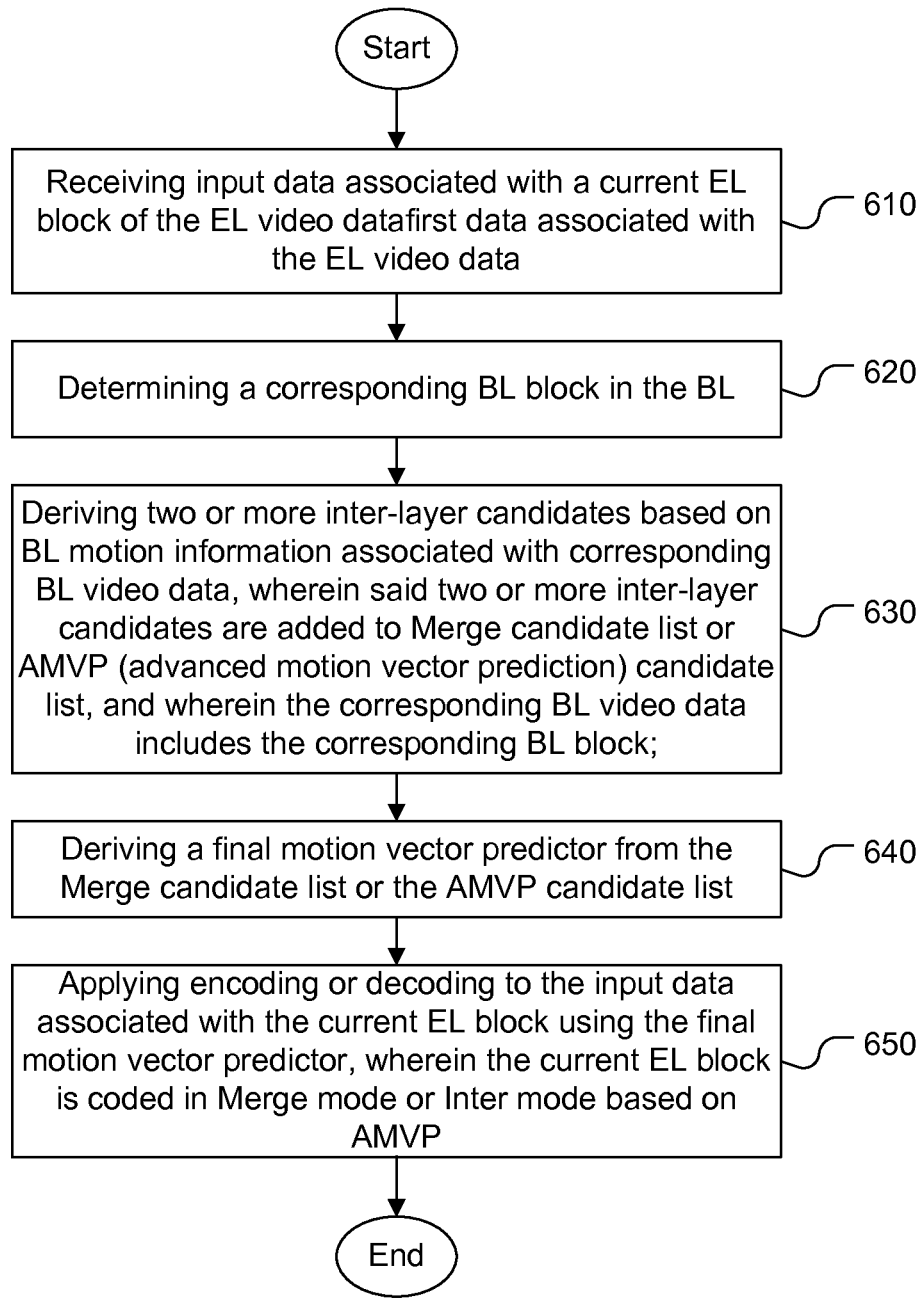
FIG. 6 illustrates an exemplary flowchart of a scalable video coding system incorporating derivation of multiple candidates to add to Merge or AMVP candidate list for an enhancement-layer block based on motion information of a corresponding base-layer block and its neighboring blocks according to an embodiment of the present invention.

FIG. 6 illustrates an exemplary flowchart of a scalable video coding system incorporating motion candidate derivation for the enhancement layer based on motion information in the base layer according to an embodiment of the present invention. The system receives input data associated with a current EL block of the EL video data as shown in step 610 and determines a corresponding BL block in the BL as shown in step 620. Two or more inter-layer candidates are derived based on BL motion information associated with corresponding BL video data as shown in step 630, wherein said two or more inter-layer candidates are added to Merge candidate list or AMVP (advanced motion vector prediction) candidate list, and wherein the corresponding BL video data includes the corresponding BL block. A final motion vector predictor is derived from the Merge candidate list or the AMVP candidate list as shown in step 640. Encoding or decoding is then applied to the input data associated with the current EL block using the final motion vector predictor, wherein the current EL block is coded in Merge mode or Inter mode based on AMVP as shown in step 650.

The flowchart shown above is intended to illustrate an example of scalable video coding. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of inter-layer prediction for scalable video coding, wherein video data is configured into a Base Layer (BL) and an Enhancement Layer (EL) and wherein EL video data has higher spatial resolution or better video quality than BL video data, the method comprising:
receiving input data associated with the EL video data, wherein the EL video data is partitioned into TUs (transform units) and each TU has a TU (transform unit) size, and the input data associated with the EL video data corresponds to inter-layer texture prediction processed video data to be coded, or coded inter-layer texture prediction processed video data to be decoded; and
selecting either a first type transform/inverse transform or a second type transform/inverse transform only depending on a size of a current TU of the EL video, and applying the selected transform/inverse transform to the input data corresponding to the current TU.

2. The method of claim 1, wherein the first type transform/inverse transform and the second type transform/inverse transform are selected from a group consisting of discrete sine transform (DST)/inverse DST and discrete cosine transform (DCT)/inverse DCT, wherein the first type transform/inverse transform is different from the second type transform/inverse transform.

3. The method of claim 1, wherein the first type transform/inverse transform is used if the current TU size is equal to a pre-defined size.

4. The method of claim 3, wherein the pre-defined size is 4×4.

5. The method of claim 1, wherein the second type transform/inverse transform is used if the current TU size is greater than a pre-defined size.

6. The method of claim 5, wherein the pre-defined size is 4×4.

7. An apparatus for inter-layer prediction in a scalable video coding system, wherein video data is configured into a Base Layer (BL) and an Enhancement Layer (EL) and wherein EL video data has higher spatial resolution or better video quality than BL video data, the apparatus comprising one or more electronic circuits, wherein said one or more electronic circuits are configured to:
receive input data associated with the EL video data, wherein the EL video data is partitioned into TUs (transform units) and each TU has a TU (transform unit) size, and the input data associated with the EL video data corresponds to inter-layer texture prediction processed video data to be coded, or coded inter-layer texture prediction processed video data to be decoded; and
select either a first type transform/inverse transform or a second type transform/inverse transform only depending on a size of a current TU of the EL video, and applying the selected transform/inverse transform to the input data corresponding to the current TU.

* * * * *